Nov. 6, 1923. 1,473,267

L. E. WEBSTER

REENFORCEMENT FOR SHOVEL HANDLES

Filed Feb. 4, 1922

Inventor,
Lewis E. Webster.
By his Attorneys
Cooper, Kerr & Dunham

Patented Nov. 6, 1923.

1,473,267

UNITED STATES PATENT OFFICE.

LEWIS E. WEBSTER, OF WYOMING, PENNSYLVANIA, ASSIGNOR TO THE WYOMING SHOVEL WORKS, OF WYOMING, PENNSYLVANIA, A CORPORATION OF PENNSYLVANIA.

REENFORCEMENT FOR SHOVEL HANDLES.

Original application filed August 6, 1920, Serial No. 401,795. Divided and this application filed February 4, 1922. Serial No. 534,177.

*To all whom it may concern:*

Be it known that I, LEWIS E. WEBSTER, a citizen of the United States of America, residing at Wyoming, in the county of Luzerne and State of Pennsylvania, have invented certain new and useful Improvements in Reenforcement for Shovel Handles, of which the following is a full, clear, and exact description.

In the manufacture of shovels and like tools where the so-called D handles are employed it has been found desirable to insert reinforcing screws in the grip portion of the D handle. The purpose of these screws has been to reinforce and strengthen the D handle, allow for an adjustment and take up, should shrinkage or a split occur. The screws or bolts heretofore used for this purpose have not been found entirely satisfactory as they tend to back out of place and it has been found difficult to properly place the same in the handle grip.

The present invention has for its object the provision of a wooden handle reinforced by slotless screws of a novel form to the general end that the completed handle will be stronger, more durable and not subject to the disadvantages and defects of former reinforced wooden handles.

Other objects and advantages will be further pointed out in the accompanying specification and shown on the drawings in which.

Figure 3:
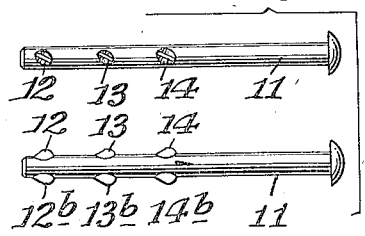
Fig. 3 shows detail top and side views of the slotless screws.

Referring to Fig. 3, the screws comprise a cylindrical stem 11, here shown as rounded. Upset from the metal of the cylindrical stem are swedged screw-threaded portions 12, 13 and 14 and a second group of threaded portions marked $12^b$, $13^b$ and $14^b$. The angle of lead of each threaded portion is such that the spirals do not align with each other. In the present embodiment I have found it preferable to displace the spirals of threaded portions 12, 13 and 14, 120° from each other. Threaded portions $12^a$, $13^b$ and $14^b$ are so arranged that the developed spirals are likewise displaced 120° relatively to each other and are also displaced 180° relatively to the corresponding spirals of threaded portions 12, 13 and 14. This relative displacement of the displaced spirals produces certain desirable results to be hereafter set forth.

Figure 1:
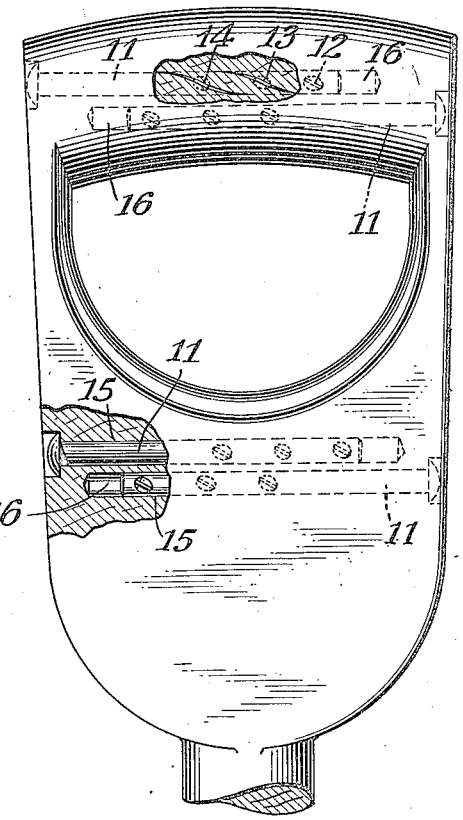
Fig. 1 is a view of a shovel handle reinforced with my novel slotless screw.
Figure 2:
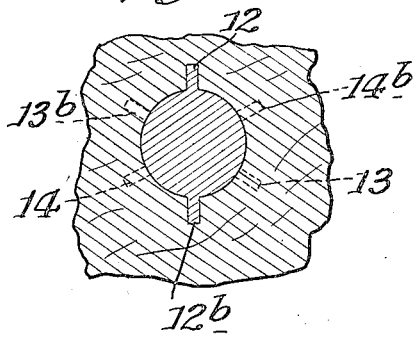
Fig. 2 is a diagrammatic view which shows the manner in which the slotless screws rotate as they enter the wood and illustrates the manner in which one screw portion closes the slot in the wood forced by the preceding screw portion.

In applying the slotless screws to reinforce a shovel handle I drill in from the sides of the grip and flat portions of the handle parallel holes 15 of such diameter as to snugly receive the shank portions of the slotless screws. The holes do not extend entirely through and have a length in excess of the length of the slotless screws as shown at 16 in Fig. 1. Preferably the ends of the holes are countersunk to provide a recess for the heads of the screws.

After drilling the slotless screws are inserted from opposite sides and driven into place by a hammer, arbor press or other tool. The driving action causes the threaded portions to enter the wood and thereafter a spiral rotation is imparted to the screw as the same is advanced. The various individual and separated thread portions all enter the wood at different places and the effect of this entry is to close up the spiral slot in the wood made by the preceding threaded portion so that finally the slotless screws are in effect molded in the wood. Furthermore, each threaded portion enters solid wood not heretofore displaced and the result is that the slotless screws are firmly secured in place in the handle and do not tend to back out. The closure of the spiral paths in the wood behind the threaded portions also occurs when the wood shrinks and this shrinkage supplements the tightening action and prevents the loosening of the screws.

Should the handle shrink enough to allow the slotless screws to protrude, the latter may be hammered in further by reason of the extended drilled opening 16, and they will thereafter be securely held in position. Also if the handle should accidentally be split, the split portion can be drawn together by driving in the slotless screws. The screws overlapping by a considerable portion of their length form a strong and rigid reenforcement for the weakest parts of the D handle.

This application is a division of my copending application Serial No. 401,795, filed August 6, 1920.

What I claim as my invention is:

1. A reinforced shovel handle comprising, in combination, a handle body portion of D-shape and having a plurality of drilled holes overlapping each other at their ends and spaced apart, a plurality of slotless screws each driven into one of said openings and each screw having a plurality of independent and separate threaded portions each lying upon a separate developed spiral to enter the body portion at varying points thereof, said screws being adapted to compress the intervening material between the overlapping ends of the drilled holes.

2. A shovel handle having a plurality of preformed holes therein, extending into the same from opposite directions, in combination with means for reinforcing the handle including screw members adapted to be driven into said preformed holes, said members being provided with means for causing the said members to be rotated by the endwise driving of the same into position.

3. A reenforcement for a shovel handle comprising a handle body portion, a plurality of slotless screws having shank portions closely fitting preformed holes in the handle body portion, said holes having a length in excess of the length of the shank of the screws, thread portions on said shank adapted to enter and embed in the wood of the handle upon the endwise driving of the same into position, said extended hole portions permitting the slotless screws to be driven into deeper positions upon the shrinkage or splitting of the handle for the purpose described.

In testimony whereof I hereto affix my signature.

LEWIS E. WEBSTER.